Patented Oct. 16, 1934

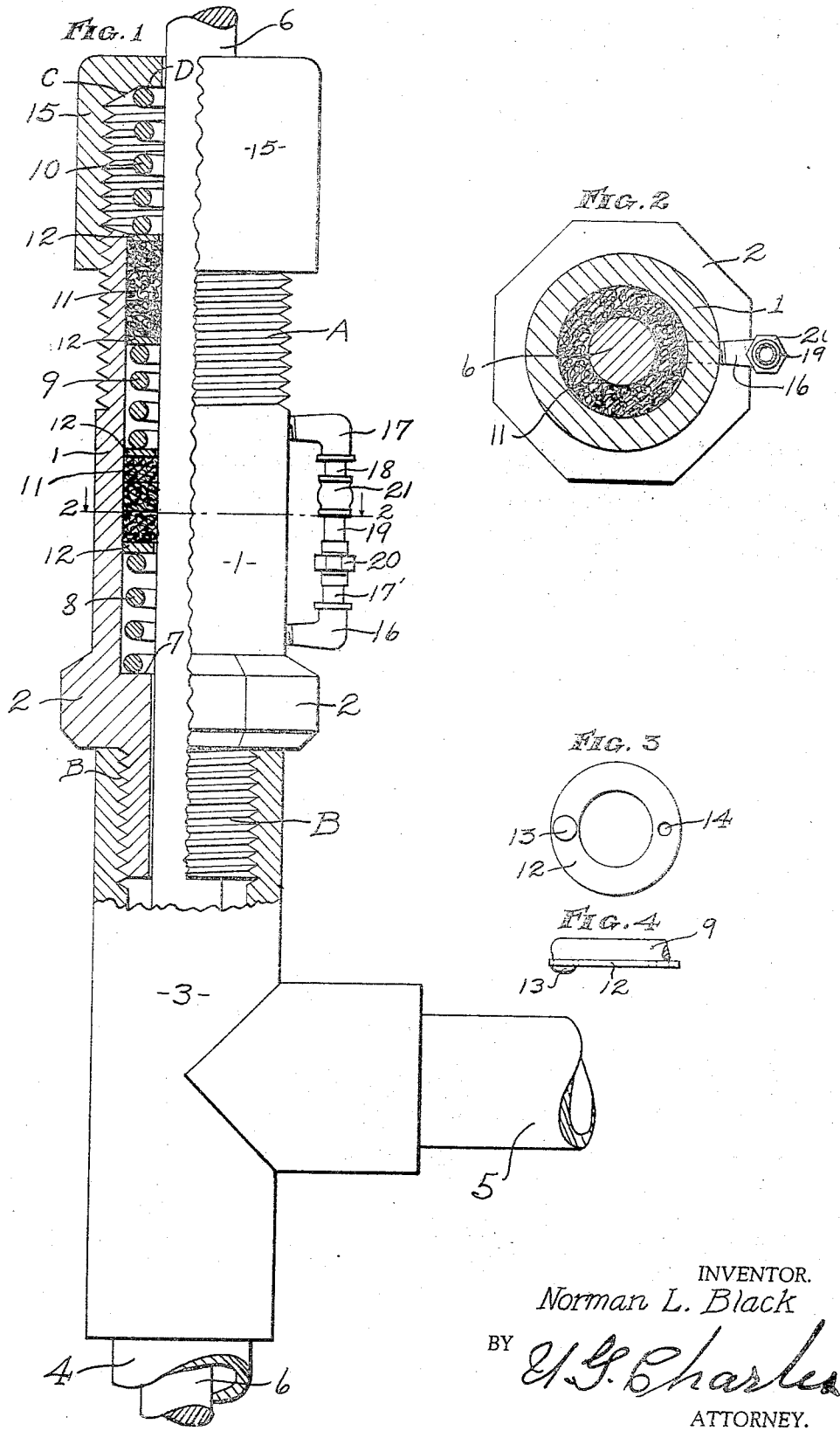

1,976,916

UNITED STATES PATENT OFFICE 1,976,916

STUFFING BOX

Norman L. Black, Andover, Kans.

Application January 23, 1933, Serial No. 652,973

3 Claims. (Cl. 286—28)

My invention relates to improvements in stuffing boxes.

The object of my invention is to provide a plurality of packing elements spaced apart in a stuffing box by springs which compress the packing, and means to compress the springs.

A further object of my invention is to provide means for the introduction of oil to each packing element.

A still further object of my invention is to provide springs concentric to the rod and supported in such a way as to avoid contact therewith.

These and other objects will hereinafter be more fully explained, reference being had to the accompanying drawing forming a part of this specification, and in which like characters will apply to like parts in the different views.

Referring to the drawing:

Fig. 1 is an elevation of the stuffing box, partly in section for convenience of illustration.

Fig. 2 is a sectional view taken on line 2—2 in Fig. 1.

Fig. 3 is a plan view of the gland washer.

Fig. 4 is an edge view of the washer and fragmentary portion of the spring attached thereto.

My invention herein disclosed relates to a stuffing box consisting of a body portion 1, each end of which is threaded as at A and B, and has an enlarged portion 2 polygonal in form and to which a wrench may be employed as turning means therefor by which means the threaded portion B is brought to engagement with fitting 3. The said fitting is adapted to connect by threaded engagement with pipes 4 and 5. Pipe 4 will be assumed for illustration as that of a casing commonly placed in oil wells while pipe 5 is a lead to a storage tank or other place of deposit for oil being pumped from an oil well, the well and storage means not shown in the drawing.

The said stuffing box is preferably made cylindrical in form and axially bored to receive a rod 6 slidably engaging therein with a smooth running fit longitudinally.

In the bore near the lower end of the stuffing box is a shoulder 7 at which point the bore varies from a greater to a lesser diameter. The greater diameter receives in working position springs 8, 9, and 10 held concentric to the rod in such a way as to avoid contact therewith.

Positioned between the said springs are fiber packings 11 composed of a plurality of annular members stacked upon each other and adapted to close the space between the inner wall of the stuffing box and the rod. Above and beneath each packing is an annular washer 12 adapted to fit around the inside wall of the body portion to avoid contact with the said rod as the opening therethru is of greater diameter than the rod, by which means the packings are uniformly compressed by their respective springs and each spring is attached to its respective washer by the insertion of an end portion thereof thru an aperture positioned in the washer and peined as indicated at 13 to avoid removal therefrom.

Diametrically positioned with respect to the connecting point of the spring is an aperture 14 thru which oil will pass and exude thru the packing as lubricating means for the reciprocating movement of the rod.

It is now shown how contact of the spring with the rod is avoided as the said springs 8, 9, engage in close proximity to the greater diameter of the body portion. Spring 10 has one end secured to its respective washer while the other end is seated in the outer end of cap 15. The said cap 15 threadedly engages on the threaded portion A of the body portion and has in the head end a beveled portion C to concentrically position the other end of the last said spring seated in the head as at D which is transverse to the axis of the body portion.

To compress the packing to snug engagement between inside wall and rod, the said cap is screwed downward compressing the springs which in turn act upon the said fiber packings. The cap is axially apertured to receive the polish rod.

When the stuffing box herein disclosed is employed in connection with the so called polish rod of an oil well pump the oil is free to fill the space occupied by spring 8, but is stopped by the adjacent packing positioned on the spring, and to introduce oil to the space occupied by spring 9, I have arranged a by-pass consisting of an L-shaped pipe fitting 16 threadedly engaging thru the body portion in communication with the bore thereof in close proximity to its lower end and another similar fitting 17 engaging in like manner communicating with the space occupied by spring 9. The said fittings are connected by nipples 17', 18, and 19, there being a union 20 as connecting means for nipples 17' and 19, and a check valve 21 as connecting means for the adjacent ends of nipples 18 and 19, by which means the accumulation of oil in the space of spring 8 is forced upward thru the by-pass to the space of spring 9 filling the same as oiling means for each of the packing elements. An extension of the by-pass may be made for the introduction of oil should a greater number of spaced packing elements be arranged.

It is now clearly shown how packing thus arranged will seal with great efficiency about a reciprocating or a rotating rod, and while I have shown and described the spring connection to the washer by inserting an end portion thru an aperture and peining the same, I do not wish to be confined to such alone as the end of the spring may abut with the face of the washer and be secured by welding. Furthermore, while I have shown and described the stuffing box in connection with a polish rod pumping oil, the same may be employed otherwise whether the rod be reciprocating or rotating, and such other modifications may be employed as lie within the scope of the appended claims, and having fully described my invention, what I claim as new and desire to secure by Letters Patent is:—

1. In a stuffing box of the class described comprising a cylindrical body portion axially bored and having a portion of each end threaded externally and a polygonal portion integral therewith spaced from the lower end to which a wrench may be applied, a shoulder arranged by reducing the bore at the lower end, a headed cap threadedly engaging on the upper end of the said body portion, the head axially bored, an annular bevel at the intersection of the head and wall of the cap to concentrically position the end of a coil spring seating on the head, the stuffing box having a polish rod extending through the bore, a plurality of springs in the bore and packing spacing the springs from each other, the packing fitting snugly around the rod and to the wall of the bore, the adjacent ends of each spring having a thin washer secured thereto to engage on the packing compressing the same uniformly when compressed by their respective springs when the cap is screwed downward, the outer end of the lower external spring seating on the shoulder while the outer end of the upper spring seats on the head within the said bevel, a by pass communicating with the bore above and below the lower packing for the purpose specified.

2. In a stuffing box of the class described comprising a body portion axially bored and having a polish rod extending therethru, the bore reduced to form a shoulder at its lower end and to receive the rod with a smooth running fit reciprocatingly, the enlarged portion of the bore as an annular working chamber, the lower end of the body threaded to engage with the casing of an oil well, the upper end being threaded and a headed cap to threadedly engage thereon, the head being bored to receive the polish rod, an annular internal bevel adjacent the inside periphery of the head, and a spring concentrically positioned in the head by the beveled portion, and a spring seated on the shoulder in the other end of the bore and an intermediate spring, a packing between each end spring and the intermediate spring, and means carried by the spring to engage on the upper and lower end of each packing and a by pass communicating with the working chamber above and below the lower packing for the purpose specified.

3. In a stuffing box, consisting of a body portion of considerable length and being bored axially but varying in diameter, the greater diameter forming an annular working chamber for springs packing and lubricant, the lesser diameter being approximately the size of the polish rod whereby a shoulder is formed at the upper end of the reduced bore, a coil spring of short length surrounding the polish rod and seated on the shoulder and having a washer on the other end secured thereto, a fiber packing placed on the washer as a seal between the rod and the wall of the bore whereby an oil chamber is provided in the space of the said spring, another spring having a washer on each end thereof to seat on the packing and another packing placed on the said spring, and another spring having a washer secured to the lower end thereof to seat on the last said packing, a headed cap threadedly engaging on the upper end of the body portion, the head bored to receive the polish rod, means in the head to concentrically support the upper ends of the last said spring to avoid its contact with the polish rod by which means the said springs and packing are tensioned as desired, a by pass communicating with a space below the first said packing and the space between the two said packings by which means the upper packing is lubricated as the polish rod reciprocates longitudinally.

NORMAN L. BLACK.